United States Patent
La Barbera et al.

(10) Patent No.: US 6,483,280 B2
(45) Date of Patent: Nov. 19, 2002

(54) ELECTRONIC CIRCUIT FOR OPTIMIZING SWITCHING LOSSES IN CURRENT-DRIVEN POWER DEVICES

(75) Inventors: Atanasio La Barbera, Mascalucia (IT); Giovanni Luca Torrisi, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/969,115

(22) Filed: Oct. 1, 2001

(65) Prior Publication Data
US 2002/0074981 A1 Jun. 20, 2002

(30) Foreign Application Priority Data
Oct. 2, 2000 (IT) .......................................... MI00A2127

(51) Int. Cl.$^7$ ................................................. G05F 1/40
(52) U.S. Cl. ...................................................... 323/271
(58) Field of Search ................................. 323/265, 266, 323/268, 271, 238, 246

(56) References Cited

U.S. PATENT DOCUMENTS

| | | | | |
|---|---|---|---|---|
| 4,725,769 A | * | 2/1988 | Cini et al. | 323/283 |
| 4,847,520 A | * | 7/1989 | O'Neil et al. | 307/296 |
| 6,133,766 A | * | 10/2000 | Pulvirenti et al. | 327/103 |

* cited by examiner

Primary Examiner—Matthew Nguyen
(74) Attorney, Agent, or Firm—Lisa K. Jorgenson; Allen, Dyer, Doppelt, Milbrath & Gilchrist, P.A.

(57) ABSTRACT

An electronic circuit is for optimizing or reducing switching losses in current-driven power devices and includes a switching power device connected to an electric load. The power devices has at least one control terminal arranged to receive a predetermined drive current value produced by a first current generator. The control terminal also receives an additional drive current portion produced by a second independent current generator. Advantageously, the electronic circuit includes a control circuit for controlling a switch connected between the second current generator and the control terminal of the switching power device during the turn-on and turn-off phases of the power device.

32 Claims, 5 Drawing Sheets

CH1: 1V
CH2: 100mA
CH3: 10mA
500n

US 6,483,280 B2

ELECTRONIC CIRCUIT FOR OPTIMIZING SWITCHING LOSSES IN CURRENT-DRIVEN POWER DEVICES

FIELD OF THE INVENTION

The present invention relates to an electronic circuit for reducing switching losses in current-driven power devices. The invention relates, particularly, but not exclusively, to an electronic circuit comprising a power device connected to an electric load and having at least one control terminal arranged to receive a predetermined drive current value.

BACKGROUND OF THE INVENTION

In most electronic applications, and especially those including high-frequency operations, there is a need for reducing or minimizing the power losses during the switching phases of the power devices. This is desired to keep the operating temperature of the power devices as low as possible.

The problems involved in reducing switching losses at turn-off are independent from the kind of load that is connected to the power device. On the contrary, in applications involving just resistive loads, and with currents that will quickly attain their maximum value, the turn-on phase must be considered.

High reactivity is demanded in the power device at turn-on, to prevent the appearance of elevated currents and/or voltages. It is in this perspective that the art has long been looking for circuit schemes that can enhance or optimize both the dynamic saturation and the performance of power devices at turn-on and turn-off.

Many of the power devices formed by discrete components and intended for driving electric loads comprise bipolar transistors. A speed-up capacitor connected in parallel with a base resistor Rb is commonly used for driving the bipolar transistors. At the turn-on phase, the capacitor supplies a current pulse that, once added to the current from the base resistor, will optimize the saturating volt age of the power transistors. At the turn-off phase, the speed-up capacitor will output a current pulse from the base terminal of the bipolar transistor. This current pulse contributes to dissipating the stored charge, thus shortening the storage time.

Integrated driver circuits for driving electric loads include final power stages that are controlled by currents that are proportional to the output currents of the power stages. A maximum current is flowed through these circuits only when needed, such as when a power element arranged to produce a current for an inductive load is driven by a drive current that is proportional to the load current.

The approaches just described have certain limitations, either where discrete components or integrated circuits are provided. For instance, when the signal originates from a resistive load, whereby the current will rise to its final value immediately, the driving method based on the proportional current cannot be applied. Also, when large currents are flowed through the circuit, the approach based on the use of discrete components will require a large speed-up capacitor and, therefore, result in a substantially higher device cost.

SUMMARY OF THE INVENTION

An object of the present invention is to provide an electronic circuit effective to reduce or optimize switching losses in current-driven power devices, such a circuit having relatively simple structural and functional features to allow enhancing the turn-on and off phases of the power device to be driven, thereby addressing the limitations of the prior art.

The circuit in accordance with the invention provides a current step additional to the drive signal and effective to lower the voltage across the power device during the switching phases of the power device. One embodiment of the invention relates to an electronic circuit for reducing or optimizing switching losses in current-driven power devices. This circuit may comprise a switching power device connected to an electric load and having at least one control terminal arranged to receive a predetermined drive current value from a current generator, and a structurally independent current generator producing a further drive current portion to supply to the control terminal. The circuit also includes a controlled switch between the independent current generator and the control terminal, and a control circuit controlling the switch during the turn-on and turn-off phases of the power device.

Another embodiment of the invention also relates to an electronic circuit for reducing switching losses in current-driven power devices. This circuit may include a power switching device connected to an electric load and having at least one control terminal receiving a first drive current value produced by a first current generator, and a first controlled switch between the first current generator and the control terminal. The circuit may also include a second current generator producing a second drive current value to be supplied to the control terminal, a second controlled switch between the second current generator and the control terminal, and a control circuit controlling the first and second switches during the turn-on and turn-off phases of the power device.

BRIEF DESCRIPTION OF THE DRAWINGS

The features and advantages of a circuit according to the invention are made apparent by the following description of an embodiment thereof, given by way of non-limiting example with reference to the accompanying drawings in which.

DETAILED DESCRIPTION OF THE PREFERRED EMBODIMENTS

With reference to the drawings, an electronic circuit according to this invention and adapted to reduce or optimize switching losses in current-driven power devices 2, is shown generally at 1 in schematic form. In a broad sense, the power devices 2 are considered herein electronic components capable of switching on/off electric loads 4, thus supplying to the load relatively large currents during the turn-on phase and cutting off such currents during the turn-off phase.

An electric load is considered herein an electric or electronic component of whatever kind but being activated by a current flow or by a predetermined voltage applied to its terminals. In this invention, the electric load may be a resistive or an inductive load, e.g. a halogen lamp 4.

Figure 1:
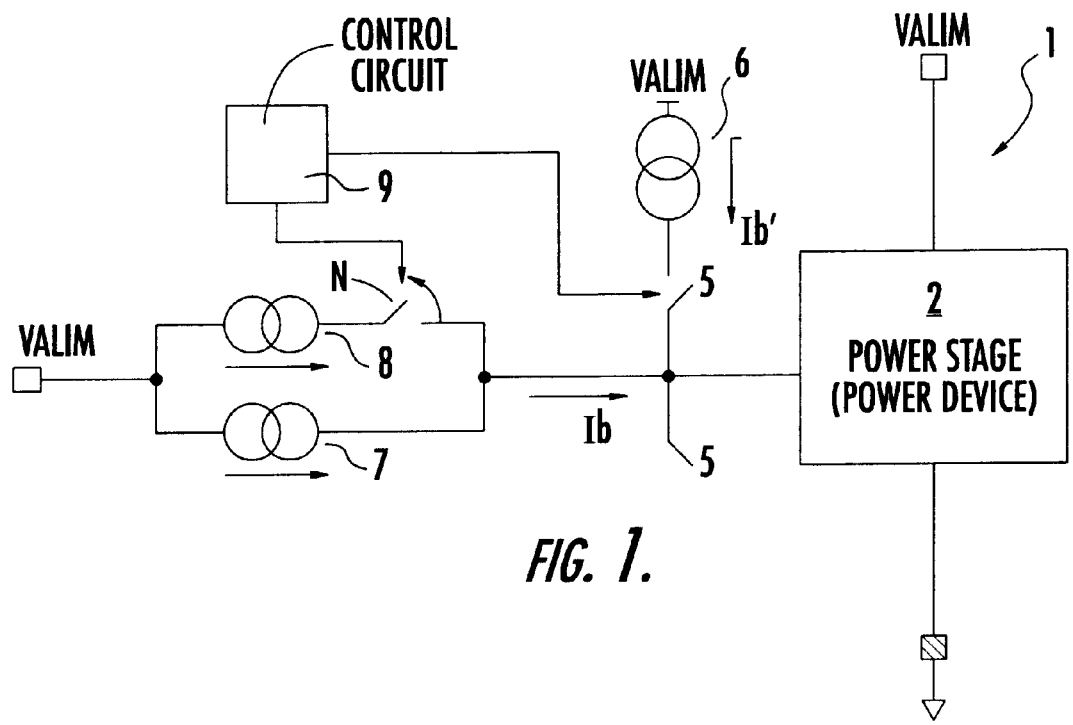
FIG. 1 shows the circuit of this invention in schematic block form.

The power device 2 is represented schematically in FIG. 1 by a block Power Stage, which is connected between a supply voltage reference Valim and a ground voltage reference GND. A control terminal 5 of the power device 2 receives a current control signal.

Advantageously in this invention, the terminal 5 will receive a first or control current Ib and a second or additional integrative current Ib'. The second or additional current Ib' is illustratively supplied from a structurally independent generator 6 through a controlled switch S.

The first current Ib is supplied to the terminal 5 from another generator 8 through a controlled switch N. A control circuit 9 is arranged to drive both switches S and N. This circuit 9 will control the duration and amplitude of the current pulse so as not to deteriorate the performance of the power device 2 at turn-off.

To enhance or optimize the performance of the circuit according to the invention, the control circuit 9 will, at turn-off, open the switch S upon the device 2 being turned off. This thereby supplies a current value Ib that is suitably smaller than the value supplied at turn-on. In this way, the charge storing and voltage drop effects can be attenuated without adversely effecting the power device saturation.

Figure 2:
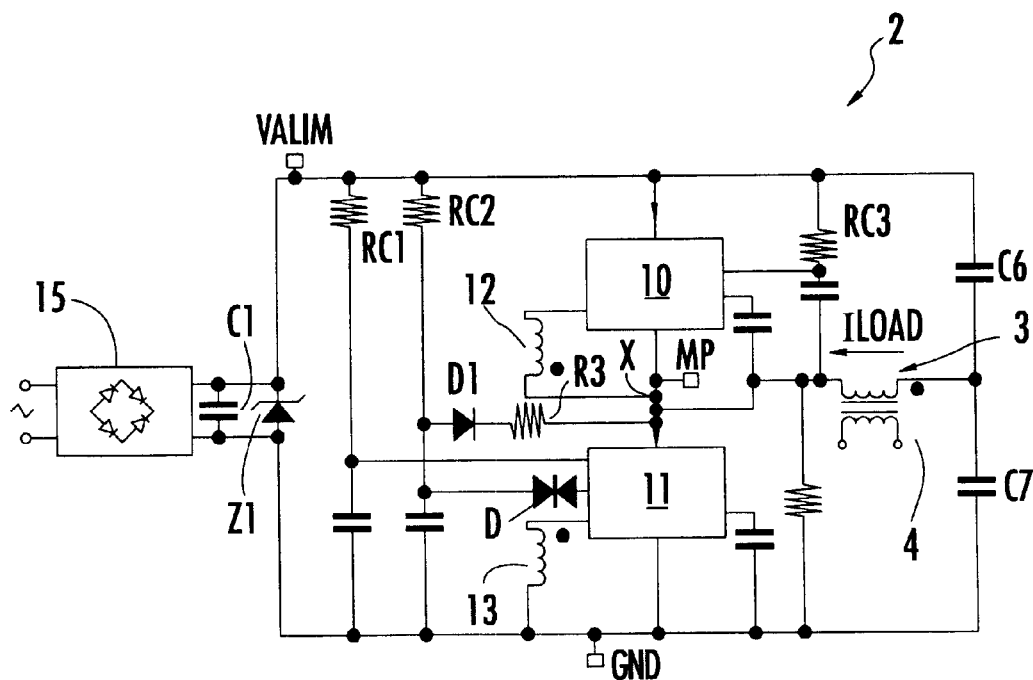
FIG. 2 shows a further embodiment of a circuit according to the present inventions

A further embodiment will now be described with reference to FIG. 2, wherein the invention is applied to a specific electronic transformer for driving a load 3 represented by a halogen lamp 4. The power device 2 is incorporated in a half-bridge structure including a pair of drive elements, specifically a high-side driver component 10 and a low-side driver component 11. These are connected in series with each other between the supply Valim and a ground reference GND.

An interconnect node X between the components 10 and 11 is connected to the halogen lamp 4. A first winding 12 is provided between the node X and the high-side component 10, and a second winding 13 is provided between the node X and the low-side component 11. A load current I flowing through the lamp 4 is switched alternately, preferably at the rate of 30 to 50 kHz, by the half-bridge legs.

A high voltage supply for the lamp is derived from an external AC source through a diode bridge rectifier 15, itself connected to a diac element comprising a parallel-connected capacitor C1 and a Zener diode Z1. A first circuit RC1 is inserted between the high voltage supply and ground to provide the voltage value Valim to be applied to the low-side component 11. A second circuit RC2 is connected between the high voltage supply and ground to provide a second voltage value to start-up a diac component D. Once the diac D oscillation has been started, a series arrangement of a diode D1 and a resistor R3 is used to turn-off the diac D. A third circuit RC3 is connected between the high voltage supply and the load 3, to supply the voltage value Valim to the high-side component 10.

A resistor R4 is connected between ground and the load 3, and a capacitor Coscill is connected between the node X and the high-side component 10. A further capacitor Coscill is connected between the ground and the low-side component 11. A pair of steadying capacitors, C6 and C7, connect the supply voltage to ground through one end of the load 3.

Figure 3:
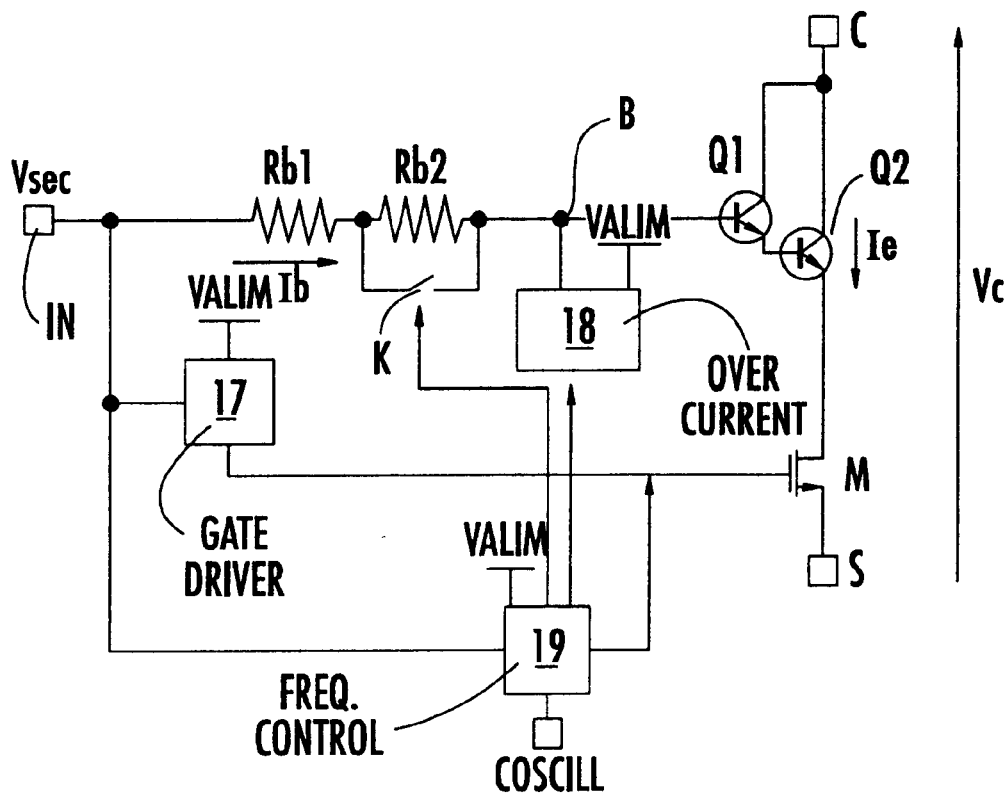
FIG. 3 shows schematically a detail of the circuit of FIG. 2.

Shown schematically in FIG. 3 is the internal structure of each of the power components, 10 or 11, and the control block 9 associated with each of them. Each component 10, 11 comprises basically an emitter-switching device.

A low voltage MOS power transistor M has its conduction terminals coupled to two terminals C and S, across which a potential drop Vc occurs. The control terminal of this transistor M is driven by a gate-driver block 17 that gets a voltage from the supply voltage Valim. The block 17 receives a voltage enable signal Vsec from a terminal IN of the power component.

A pair of bipolar transistors, Q1 and Q2, are interconnected in a Darlington configuration and placed between the terminal C and the MOS transistor M. The base terminal B of the first, Q1, of the bipolar transistors is applied a current signal through a series of a resistor pair, Rb1 and Rb2. The series resistor Rb2 in the pair can be short-circuited through a controlled switch K.

An over current block 18 (Dynamic Vc) has an output connected to the base terminal B. This block 18 is supplied by the voltage value Valim and controlled from a frequency control block 19. This block 19 also drives the switch K and the control terminal of the MOS transistor M. This block 19 is supplied by the voltage value Valim and connected to one end of a capacitor Coscill. The gate driver block 17 functions to deliver a useful signal to the gate of transistor in the presence of secondary.

By charging a capacitor, the frequency control block 19 sets the conduction time length or duration of the power transistor M, and man ages the over current generating block 18. The turn-on duration of the power device 2 is controlled by a comparator 20, shown in FIG. 4, which comprises MOS transistors M21, M22, M23, M24. This comparator 20 is powered through a transistor M20, which represents a second leg of a current mirror 21 that also comprises a MOS transistor M16, the latter being enabled in the presence of secondary current. The comparator 20 serves to compare the charge in the capacitor Coscill—as derived from the current of a transistor M33, which transistor mirrors transistor M16—with the potential across a resistor R2.

When a voltage Vcoscill exceeds a voltage drop VR2, the output from the comparator 20 enables an N-channel transistor M34 arranged to turn off a double inverter 22, 23 comprising transistors M18, M19, M25, M26. This double inverter forms the gate driver block 17. A second comparator 24, comprising transistors M12, M13, M14, M15 and being powered through a further transistor M11, will compare the signal at the capacitor Coscill with the potential at the resistor R5. The output from the second comparator 24 is initially low, and enables, through the double inverter 22, 23, a PMOS transistor arranged to provide the over current Ib'.

When the voltage Vcoscill exceeds a voltage drop VR5, the PMOS transistor is disabled. By suitably selecting the value of VR5 relative to VR2, the duration of the current supply with the additional current Ib' can be set with respect to the turn-on duration of the power device 2.

A third comparator 25, comprising transistors M36, M37, M38, M39, is powered through a transistor M35 and drives a PMOS transistor M42 through an inverter M40, M41. So long as the voltage Vcoscill is less than a voltage drop VR7, the PMOS transistor M42 stays 'on', and the base current is supplied through the resistor Rb1 only. On the other hand, as the comparator 25 switches over, the PMOS transistor M42 is turned off, and the base current of the bipolar transistor Q1 is set by the series of resistors Rb1 and Rb2.

Figure 4:
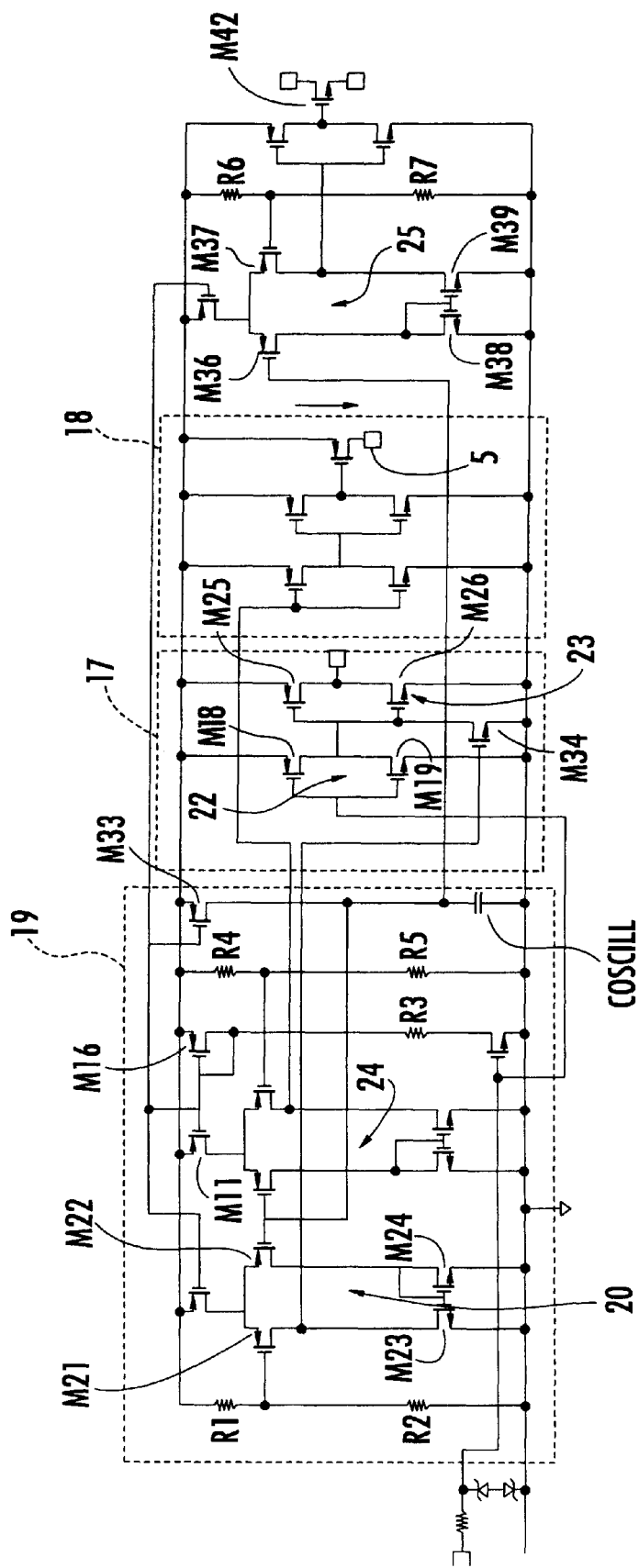
FIG. 4 is a detailed circuit diagram illustrating an embodiment of the inventive circuit.
Figure 5:
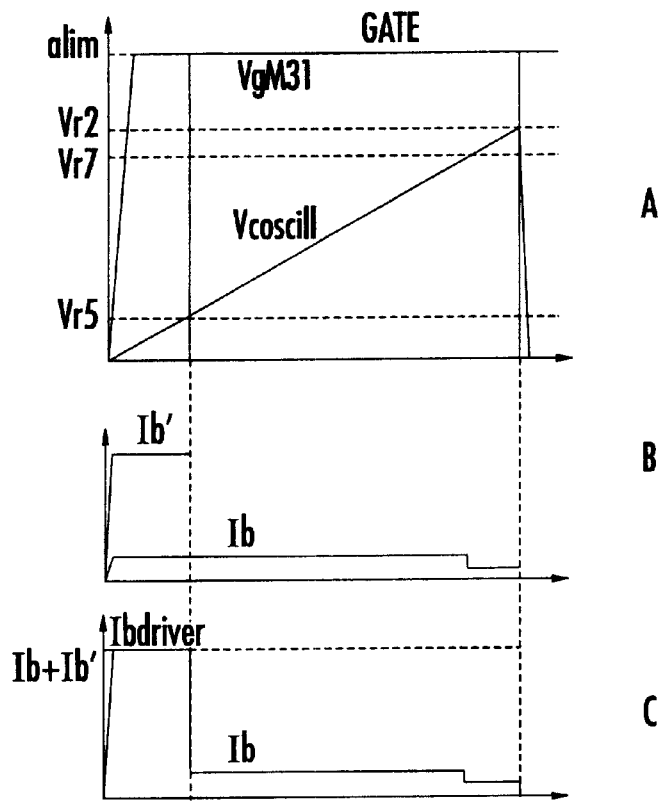
FIGS. 5A, 5B and 5C are respective voltage and current plots versus time for signals present in the circuit of FIG. 4.
Figure 6:
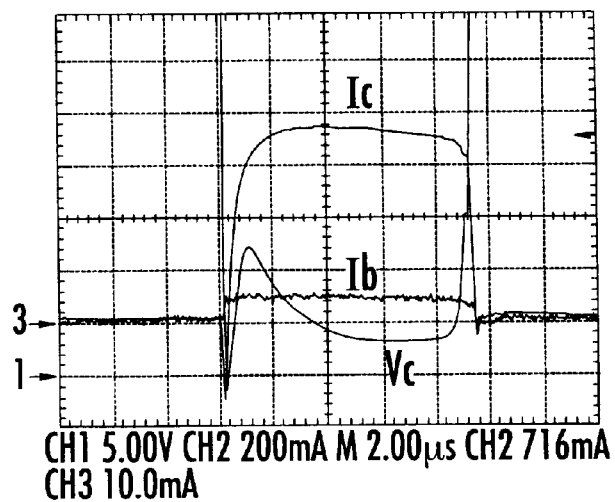
FIGS. 6 and 7 are comparative plots of voltage and current signals present in driver circuits, with and without the circuit portion of this invention, respectively.
Figure 7:
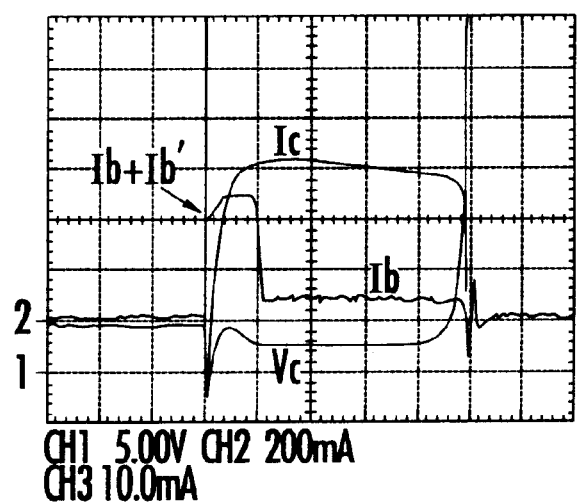

Plotted in FIGS. 5A, 5B and 5C are some signals present in the circuit portion of FIG. 4. In particular the voltage Vcoscill and currents Ib, Ib' are shown. FIGS. 6 and 7 show waveforms of voltage Vc, current Ic and current Ib, respectively, plotted versus time, for driver circuits of a resistive load, with and without the reducing or optimizing electronic circuit of this invention.

These graphs bring out that the appearance of a step due to the additional current Ib' is effective to drastically reduce the voltage drops across the power device 2 during the turn-off phase. It can be further seen from the graphs that an appropriate decrease in the base current shortly before the turn-off is beneficial in terms of charge storing and voltage drop without affecting performance at turn-on.

Figure 9:
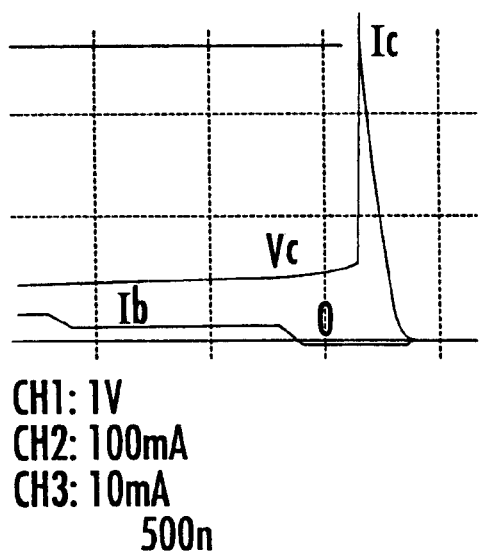
FIGS. 8 and 9 are further comparative plots of voltage and current signals present in the circuit of this invention during the turn-off phase.
Figure 8:
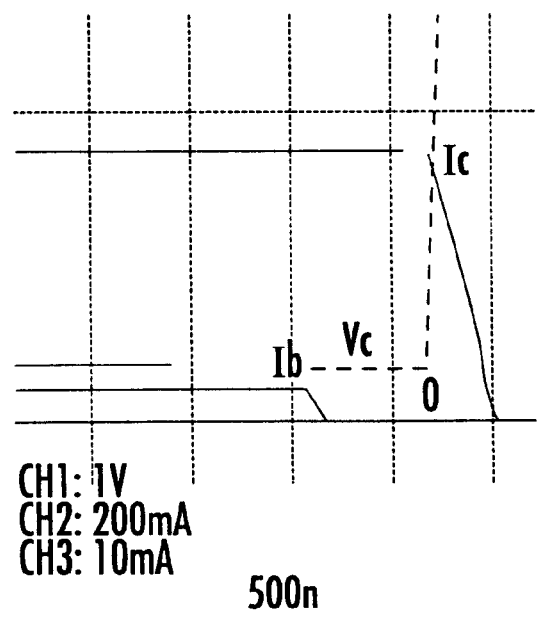

FIGS. 8 and 9 show waveforms of voltage Vc, current Ic and current Ib, respectively, plotted versus time, during the turn-off phase. These graphs bring out as a suitable reduction of the base current, close to the turn-off phase, provides benefits in terms of charge storage and voltage drop while maintaining the circuit performances during the turn-on phase.

From the foregoing it will be appreciated that, although specific embodiments of the invention have been described herein for purposes of illustration, various modifications may be made without deviating from the spirit and scope of the invention. Accordingly, the invention is not limited except as by the appended claims.

That which is claimed is:

1. An electronic circuit for supplying a load and having reduced switching losses, the electronic circuit comprising:
   a first current generator producing a first drive current;
   a structurally independent second current generator producing a second drive current;
   a switching power device for connecting to the load and having at least one control terminal;
   a first switch between said structurally independent second current generator and said at least one control terminal of said switching power device; and
   a control circuit controlling said first switch during turn-on and off phases of said switching power device.

2. An electronic circuit according to claim 1 wherein said switching power device comprises:
   a power transistor having first and second conduction terminals, the second conduction terminal connected to a voltage reference; and
   a plurality of transistors connected between the first conduction terminal and a power supply.

3. An electronic circuit according to claim 2 wherein said plurality of transistors comprises first and second bipolar transistors connected in a Darlington configuration; and wherein said first bipolar transistor has a base terminal being driven by an adjustable current signal.

4. An electronic circuit according to claim 3 further comprising:
   an input terminal receiving a voltage enabling signal;
   a plurality of resistors connected in series between said input terminal and said base terminal; and
   a second switch connected to selectively short-circuit at least one of said resistors according to switching needs.

5. An electronic circuit according to claim 3 further comprising:
   a frequency control block; and
   an over current block controlled by said frequency control block and having an output connected to said base terminal.

6. An electronic circuit according to claim 4 further comprising a frequency control block driving said second switch and the control terminal of said power transistor thus setting a conduction duration thereof.

7. An electronic circuit according to claim 2 wherein said power transistor comprises a MOS transistor.

8. An electronic circuit according to claim 2 further comprising a gate driver block having an output connected to the control terminal of said power transistor and an input receiving a voltage enabling signal.

9. An electronic circuit according to claim 8 further comprising a frequency control block having an output connected to the control terminal of said power transistor and an input receiving the voltage enabling signal.

10. An electronic circuit for supplying a load and having reduced switching losses, the electronic circuit comprising:
    a first current generator producing a first drive current;
    a second current generator producing a second drive current;
    a switching power device for connecting to the load and having at least one control terminal; and
    a controller for selectively connecting said second current generator to the at least one control terminal of said switching power device during at least one of a turn-on and off phase of said switching power device.

11. An electronic circuit according to claim 10 wherein said controller comprises:
    a first switch between said second current generator and said at least one control terminal of said switching power device; and
    a control circuit controlling said first switch.

12. An electronic circuit according to claim 10 wherein said switching power device comprises:
    a power transistor having first and second conduction terminals, the second conduction terminal connected to a voltage reference; and
    a plurality of transistors connected between the first conduction terminal and a power supply.

13. An electronic circuit according to claim 12 wherein said plurality of transistors comprises first and second bipolar transistors connected in a Darlington configuration; and wherein said first bipolar transistor has a base terminal being driven by an adjustable current signal.

14. An electronic circuit according to claim 13 further comprising:
    an input terminal receiving a voltage enabling signal;
    a plurality of resistors connected in series between said input terminal and said base terminal; and
    a second switch connected to selectively shortcircuit at least one of said resistors according to switching needs.

15. An electronic circuit according to claim 13 further comprising:
    a frequency control block; and
    an over current block controlled by said frequency control block and having an output connected to said base terminal.

16. An electronic circuit according to claim 14 further comprising a frequency control block driving said second switch and the control terminal of said power transistor thus setting a conduction duration thereof.

17. An electronic circuit according to claim 12 wherein said power transistor comprises a MOS transistor.

18. An electronic circuit according to claim 12 further comprising a gate driver block having an output connected to the control terminal of said power transistor and an input receiving a voltage enabling signal.

19. An electronic circuit according to claim 18 further comprising a frequency control block having an output connected to the control terminal of said power transistor and an input receiving the voltage enabling signal.

20. An electronic circuit for supplying a load and having reduced switching losses and comprising:

a first current generator producing a first drive current;

a second current generator producing a second drive current;

a switching power device for connecting to the load and having at least one control terminal; and a controller for selectively connecting said first and second current generators to the at least one control terminal of said switching power device during turn-on and off phases of said switching power device.

21. An electronic circuit according to claim 20 wherein said controller comprises:

a first switch between said first current generator and said at least one control terminal of said switching power device;

a second switch between said second current generator and said at least one control terminal of said switching power device; and a control circuit controlling said first and second switches.

22. An electronic circuit according to claim 21 wherein said switching power device comprises:

a power transistor having first and second conduction terminals, the second conduction terminal connected to a voltage reference; and a plurality of transistors connected between the first conduction terminal and a power supply.

23. An electronic circuit according to claim 22 wherein said plurality of transistors comprises first and second bipolar transistors connected in a Darlington configuration; and wherein said first bipolar transistor has a base terminal being driven by an adjustable current signal.

24. An electronic circuit according to claim 23 further comprising:

an input terminal receiving a voltage enabling signal;

a plurality of resistors connected in series between said input terminal and said base terminal; and a third switch connected to selectively short-circuit at least one of said resistors according to switching needs.

25. An electronic circuit according to claim 23 further comprising:

a frequency control block; and an over current block controlled by said frequency control block and having an output connected to said base terminal.

26. An electronic circuit according to claim 24 further comprising a frequency control block driving said third switch and the control terminal of said power transistor thus setting a conduction duration thereof.

27. An electronic circuit according to claim 22 wherein said power transistor comprises a MOS transistor.

28. An electronic circuit according to claim 22 further comprising a gate driver block having an output connected to the control terminal of said power transistor and an input receiving a voltage enabling signal.

29. An electronic circuit according to claim 28 further comprising a frequency control block having an output connected to the control terminal of said power transistor and an input receiving the voltage enabling signal.

30. A method for supplying a load using an electronic circuit having reduced switching losses, the electronic circuit comprising a switching power device having at least one control terminal, the method comprising:

producing a first drive current;

producing a second drive current; and selectively supplying the first and second drive currents to the at least one control terminal of the switching power device during at least one of a turn-on and off phase of the switching power device.

31. A method according to claim 30 wherein the switching power device comprises a power transistor having first and second conduction terminals, the second conduction terminal connected to a voltage reference; and first and second bipolar transistors connected in a Darlington configuration between the first conduction terminal and a power supply; and further comprising:

driving a base terminal of the first bipolar transistor by an adjustable current signal.

32. A method according to claim 31 wherein the power transistor comprises a MOS transistor.

* * * * *